(12) United States Patent
Kleinschmidt

(10) Patent No.: US 6,667,804 B1
(45) Date of Patent: Dec. 23, 2003

(54) TEMPERATURE COMPENSATION METHOD FOR WAVEMETERS

(75) Inventor: Juergen Kleinschmidt, Weissenfels (DE)

(73) Assignee: Lambda Physik AG, Goettingen (DE)

( * ) Notice: Subject to any disclaimer, the term of this patent is extended or adjusted under 35 U.S.C. 154(b) by 469 days.

(21) Appl. No.: 09/686,483

(22) Filed: Oct. 10, 2000

Related U.S. Application Data

(60) Provisional application No. 60/158,808, filed on Oct. 12, 1999.

(51) Int. Cl.⁷ .................................................. G01J 3/28
(52) U.S. Cl. ........................ 356/326; 356/328; 372/32; 372/34
(58) Field of Search ................................ 356/326, 328, 356/333, 331; 372/32, 29.02, 20, 34

(56) References Cited

U.S. PATENT DOCUMENTS

| | | | |
|---|---|---|---|
| 4,319,843 A | 3/1982 | Gornall | 356/346 |
| 4,404,366 A | 9/1983 | Boguslaski et al. | 536/18.1 |
| 4,684,253 A * | 8/1987 | Lindblom et al. | 356/333 |
| 4,823,354 A | 4/1989 | Znotins et al. | 372/57 |
| 4,905,243 A | 2/1990 | Lokai et al. | 372/32 |
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 5,025,445 A | 6/1991 | Anderson et al. | 372/20 |
| 5,081,635 A | 1/1992 | Wakabayashi et al. | 372/57 |
| 5,142,543 A | 8/1992 | Wakabayashi et al. | 372/32 |
| 5,144,632 A | 9/1992 | Thonn | 372/33 |
| 5,198,872 A | 3/1993 | Wakabayashi et al. | 356/352 |
| 5,218,421 A | 6/1993 | Wakabayashi et al. | 356/352 |
| 5,373,515 A | 12/1994 | Wakabayashi et al. | 372/20 |
| 5,420,877 A | 5/1995 | Sandstrom | 372/34 |
| 5,450,207 A | 9/1995 | Fomenkov | 356/416 |
| 5,479,431 A | 12/1995 | Sobottke et al. | 372/92 |
| 5,748,316 A | 5/1998 | Wakabayashi et al. | 356/352 |
| 5,764,678 A | 6/1998 | Tada | 372/57 |
| 5,771,094 A | 6/1998 | Carter et al. | 356/326 |
| 5,835,520 A | 11/1998 | Das et al. | 372/57 |
| 5,856,991 A | 1/1999 | Ershov | 372/57 |
| 5,867,514 A | 2/1999 | Anderson | 372/38 |
| 5,901,163 A | 5/1999 | Ershov | 372/20 |
| 5,978,391 A | 11/1999 | Das et al. | 372/20 |
| 5,978,394 A | 11/1999 | Newman et al. | 372/32 |
| 5,991,324 A | 11/1999 | Knowles et al. | 372/57 |
| 6,243,163 B1 * | 6/2001 | Wakabayashi et al. | 356/326 |

FOREIGN PATENT DOCUMENTS

| | | | |
|---|---|---|---|
| DE | 41 14 407 A1 | 11/1992 | |
| EP | 0 570 243 A1 | 5/1993 | ........... G01S/3/139 |
| EP | 0 454 399 B1 | 9/1995 | ............. H01S/3/17 |
| EP | 0 855 811 A2 | 7/1998 | ......... H04B/10/145 |
| EP | 0 875 743 A1 | 11/1998 | ............. G01J/9/02 |
| EP | 0 867 989 B1 | 9/1999 | ......... H01S/3/1055 |
| EP | 1 063 503 A1 | 12/2000 | ............. G01J/9/02 |
| WO | WO 96/07224 | 3/1996 | ............. H01S/3/13 |

OTHER PUBLICATIONS

MacBride, et al., "Effect of Temperature Variation on FT–IR Spectomoter Stability," *Applied Spectroscopy*, 1997, vol. 51, No. 1, pp. 43–50.

J. Caplan, "Temperature and Pressure Effects on Pressure–Scanned Etalons and Gratings," *Applied Optics*, vol. 14, No. 7, Jul. 1975, pp. 1585–1591.

\* cited by examiner

*Primary Examiner*—Frank G. Font
*Assistant Examiner*—Layla Lauchman
(74) *Attorney, Agent, or Firm*—Stallman & Pollock LLP

(57) ABSTRACT

A wavemeter for monitoring a wavelength of emission from a tunable laser includes a spectrometer disposed within a housing having a controlled pressure, and a temperature sensor and/or a pressure sensor for sensing the temperature and/or pressure, respectively, within the housing. The temperature and/or pressure are controlled such that they have relative values, and materials are selected, each for substantially minimizing temperature sensitivity of the spectrometer, such as for providing a temperature sensitivity of the spectrometer within ±0.1 pm/°K.

21 Claims, 3 Drawing Sheets

US 6,667,804 B1

TEMPERATURE COMPENSATION METHOD FOR WAVEMETERS

PRIORITY

This application claims the benefit of priority to U.S. provisional patent application No. 60/158,808, filed Oct. 12, 1999.

BACKGROUND OF THE INVENTION

1. Field of the Invention

The invention relates to wavemeters for monitoring a wavelength of emission of a tunable laser, and particularly to controlling temperature dependent offset of measured wavelengths.

2. Discussion of the Related Art

Narrow band ArF and KrF excimer lasers ($\lambda$=193 nm, 248 nm, respectively) and the molecular fluorine ($F_2$) laser ($\lambda$=157 nm) are used for photolithographic applications involved in the production of integrated circuits. Excimer laser radiation is typically used for producing structures in the dimensional range of 0.18–0.25 nm for the KrF laser, or between around 0.13–0.18 nm for the ArF laser. The 157 nm radiation of the $F_2$-laser) may be used for producing feature sizes of <0.13 nm.

Achromatic imaging optics are difficult to produce for this wavelength region. For this reason, radiation of narrow bandwidth is used to reduce imaging errors caused by chromatic aberations in the imaging optics. Typical acceptable bandwidths are in the range of 0.3–0.6 pm.

The narrowed laser emissions of excimer lasers are typically tunable within their broadband characteristic emission spectra. The emission wavelengths of these lasers is desired to be detected and controlled typically with an accuracy ±0.05 pm.

To this aim, a monitor etalon may be sealed off inside a housing of an etalon spectrometer arrangement for detecting and controlling the laser emission wavelength in conjunction with an absolute wavelength calibration procedure using a known absorption or emission line. The housing may be an evacuated housing (U.S. Pat. No. 5,025,445). A good vacuum is, however, difficult to maintain and such an evacuated housing typically involves using materials having low outgassing characteristics.

U.S. Pat. No. 5,420,877 discloses to periodically measure the temperature inside of a sealed etalon spectrometer housing using a sensor and a microcomputer to correct the spectrometer output according to formula (1):

$$\lambda_{corr}=\lambda\text{etalon}+k_1\Delta T+k_2\Delta T/\Delta t \qquad (1)$$

where $\Delta T$ is a difference between the measured temperature and a nominal temperature at which the wavemeter needs no correction; $k_1$ is a coefficient of temperature sensitivity of the etalon and housing; $k_2$ is a coefficient of sensitivity of the etalon to the time rate of change of the temperature ($\Delta T/\Delta t$).

The etalon wavemeter may be placed in a temperature stabilized enclosure (e.g., an oven). The U.S. Pat. No. 5,420,877 discloses that this typically involves a comparatively long time from the cold start of the laser before a desired wavelength accuracy and stability may be achieved.

RECOGNIZED IN THE PRESENT INVENTION

In a sealed housing filled with a gas (e.g., nitrogen), the total mass of the gas within the housing is fixed. It is recognized in the present invention that there are at least three effects that will cause changes in a measured interference pattern from a monitor etalon, which pattern is used to determine the wavelength of incident radiation:

1. Since the internal volume of the housing varies with the temperature ($\Delta V/V=3\alpha_h \Delta T$, $\alpha_h$ being the linear expansion coefficient of the housing material), the gas density varies inversely with the volume V, which effects the output pattern of the etalon.
2. Since the output pattern of the etalon also varies with the gap spacing between its plates, expansion of etalon spacers due to temperature variations ($\Delta\delta/\delta=\alpha_s \Delta T$, $\delta$ being the spacer thickness, $\alpha_s$ being the linear expansion coefficient of the spacer material) will effect the etalon output pattern.
3. If the temperature is not uniform within the housing, as can be the case when temperatures are rising and falling, the internal gas density $\rho \propto 1/T$ will be spatially and temporally dependent, again effecting the output pattern of the etalon.

SUMMARY OF THE INVENTION

It is an object of the invention to provide a wavemeter having high thermal stability.

It is a further object of the invention to provide a wavemeter wherein thermal variations of measured wavelengths from actual wavelengths are minimized, such as preferably within ±0.1 pm/°K.

In accord with the above objects, a wavemeter for monitoring a wavelength of emission from a tunable laser is provided including a spectrometer disposed within a housing having a controlled pressure, and a temperature sensor for sensing the temperature within the housing, and a heater for adjusting the temperature within the housing, wherein the temperature is maintained approximately around a predetermined value, which value is selected based at least in part on a pressure within the housing, for providing a temperature sensitivity of the spectrometer within ±0.1 pm/°K.

In further accord with the above objects, a wavemeter for monitoring a wavelength of emission from a tunable laser is provided including a spectrometer disposed within the housing having a controlled pressure, and a temperature controller for maintaining a temperature within the housing at approximately around a predetermined value, which value is selected based at least in part on a pressure within the housing, for providing a temperature sensitivity of the spectrometer within ±0.1 pm/°K.

In further accord with the above objects, a wavemeter for monitoring a wavelength of emission from a tunable laser is provided including a spectrometer disposed within a housing having at least one port for controlling a pressure therein, and a pressure sensor, wherein a pressure within the housing is controlled at a predetermined value which is selected based at least in part on a temperature within said housing, for providing a temperature sensitivity of the spectrometer within ±0.1 pm/°K.

In further accord with the above objects, a wavemeter for monitoring a wavelength of emission from a tunable laser is provided including a spectrometer disposed within a housing, wherein at least one of a temperature and a pressure within the housing is preset and substantially maintained at a predetermined value with respect to at least one of the pressure and the temperature, respectively, for providing a temperature sensitivity of the spectrometer within ±0.1 pm/°K.

In further accord with the above objects, a method is provided for monitoring a wavelength of emission from a tunable laser, using a wavemeter including a spectrometer. The method includes disposing the spectrometer within a housing having a controlled pressure, sensing a temperature at least indicative of a temperature within the housing proximate to the spectrometer, and controlling the temperature within the housing approximately around a predetermined value, which value is selected based at least in part on a pressure within the housing, for providing a temperature sensitivity of the spectrometer within ±0.1 pm/°K.

In further accord with the above objects, a method is provided for monitoring a wavelength of emission from a tunable laser, using a wavemeter including a spectrometer. The method includes disposing the spectrometer within a housing having a controlled pressure, sensing a pressure at least indicative of a pressure within the housing proximate to said spectrometer, and controlling the pressure within the housing approximately around a predetermined value which is selected based at least in part on a temperature within the housing, for providing a temperature sensitivity of the spectrometer within ±0.1 pm/°K.

In further accord with the above objects, a method is provided for monitoring a wavelength of emission from a tunable laser, using a wavemeter including a spectrometer. The method includes disposing the spectrometer within a housing having a controlled pressure, and presetting and substantially maintaining a temperature and a pressure within the housing at substantially predetermined values for providing a temperature sensitivity of the spectrometer within ±0.1 pm/°K.

INCORPORATION BY REFERENCE

What follows is a cite list of references each of which is, in addition to those references cited above and below, and that which is described as background and recognized in the invention, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

J. Caplan, Appl. Opt. 14, p. 1585 (1975);
Handbook of Chemistry and Physics $62^{nd}$ edition (1981–1982);
U.S. Pat. Nos. 5,420,877, 5,025,445, 4,905,243, 5,835,520, 5,856,991, 5,867,514, 5,901,163, 5,978,391, 5,978,394, 5,991,324, 5,450,207, 4,404,366, 4,926,428, 5,218,421, 5,373,515, 5,748,316, 5,198,872, 4,975,919, 5,142,543, 5,081,635, 5,771,094, 5,764,678, 4,914,662, 4,911,778, 4,823,354, and 4,319,843; and
U.S. patent application Ser. Nos. 09/136,275, 09/416,344, 09/271,020, Nos. 60/172,749, 60/186,003, and 60/218,417, each of which is assigned to the same assignee as the present application.

DETAILED DESCRIPTION OF THE PREFERRED EMBODIMENTS

Several embodiments of wavemeters for monitoring emission wavelengths of tunable lasers are set forth below which each have an advantageously reduced temperature sensitivity relative to those described in the background discussion above. That is, a reduction of the quantity $d\lambda/dT$ is observed in the several embodiments below, where $d\lambda/dT$ is the temperature derivative of the measured wavelength using the wavemeter in accord with these preferred embodiments.

Figure 1A:
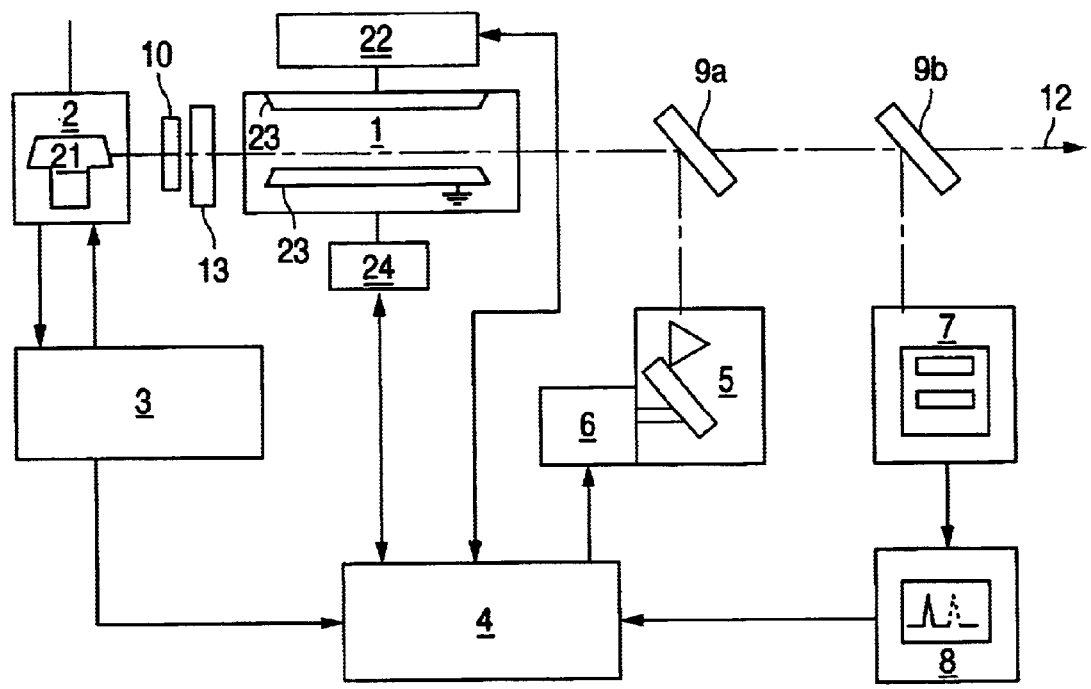
FIG. 1a schematically shows a first embodiment of a laser system in accord with a preferred embodiment.

Referring to FIG. 1a, a gas discharge laser system, preferably a DUV or VUV laser system, such as an excimer, e.g., ArF or KrF, or molecular fluorine ($F_2$) laser system for deep ultraviolet (DUV) or vacuum ultraviolet (VUV) lithography, is schematically shown. Alternative configurations for laser systems for use in such other industrial applications as TFT annealing and/or micromachining, e.g., are understood by one skilled in the art as being similar to and/or modified from the system shown in FIG. 2 to meet the requirements of that application. For this purpose, alternative DUV or VUV laser system and component configurations are described at U.S. patent application Ser. Nos. 09/317,695, 09/317,526, 09/130,277, 09/244,554, 09/452,353, 09/317,527, 09/343,333, Nos. 60/122,145, 60/140,531, 60/162,735, 60/166,952, 60/171,172, 60/141,678, 60/173,993, 60/166,967, 60/147,219, 60/170,342, 60/162,735, 60/178,445, 60/166,277, 60/167,835, 60/171,919, 60/202,564, 60/204,095, 60/172,674, Ser. No. 09/574,921 and No. 60/181,156, and U.S. Pat. Nos. 6,005,880, 6,061,382, 6,020,723, 5,946,337, 6,014,206, 5,559,816, 4,611,270, 5,761,236, each of which is assigned to the same assignee as the present application and is hereby incorporated by reference.

The system shown in FIG. 1a generally includes a laser chamber 1 having a pair of main discharge electrodes 23 connected with a solid-state pulser and high voltage power supply module or modules 22, and a gas handling module 24. The solid-state pulser module 22 is powered by a high voltage power supply (not separately shown). The laser chamber 1 is surrounded by optics module 10 and optics module 5, forming a resonator. The optics modules 10 and 5 are preferably controlled by an optics control module, or may be alternatively directly controlled by a computer 4.

The optics module 10 may be a resonator mirror, as shown, or may be used to outcouple the beam, wherein the wavelength calibration tool is moved to another location. As an output coupler, the optics module 10 may be a partially reflecting mirror, an etalon, a transmission grating, a transmission grism or a birefringent plate or block, such as may be described in any of U.S. patent application Nos. 60/166,277, 60/212,257 and 60/173,993, each of which is assigned to the same assignee and is hereby incorporated by reference.

The optics module 5 preferably includes line narrowing components such as a dispersive grating, a dispersive prism or prisms, a prism beam expander and optionally one or more etalons. The beam may be reflected at a beam splitter 9a or may be received by the optics module 5 directly from the laser chamber 1.

A motor drive 6 for tuning the grating of the optics module 5 is shown, such as in a Littrow configuration. Alternatively, a Littman configuration may be used where a mirror is disposed between the beam expander and grating, wherein the mirror is rotated and the grating fixed. The wavelength may also be pressure tuned such as may be described in U.S. patent application No. 60/178,445, which is assigned to the same assignee as the present application and is hereby incorporated by reference.

The computer 4 for laser control receives various inputs and controls various operating parameters of the system. A diagnostic module 7 receives and measures one or more parameters of a split off portion of the main beam 12 via optics for deflecting a small portion of the beam toward the module 7, such as preferably a beam splitter module 9b, as shown. The beam 12 is preferably the laser output to an imaging system (not shown) and ultimately to a workpiece (also not shown), and may be output directly to an application process. The laser control computer 4 communicates preferably through an interface (not shown) with a stepper/scanner computer (not shown) and possibly other control units. A display 8 is shown for display of the wavelength monitoring pattern from a wavelength monitoring module of the diagnostic module 7.

A wavelength calibration tool 2 is shown for absolute wavelength calibration of a relative wavelength monitoring tool of the diagnostic module 7, which will be described in more detail below. A signal processing and driving source 3 for the wavelength calibration tool 2 is also shown communicating with the computer 4. An optional polarizer 13 is also shown.

Laser Chamber

The laser chamber 1 contains a laser gas mixture and includes one or more preionization electrodes (not shown) in addition to the pair of main discharge electrodes 23. Preferred main electrodes 23 are described at U.S. patent application Ser. No. 09/453,670, Nos. 60/184,705 and 60/128,227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Nos. 60,162,845, 60/160,182, 60/127,237, Ser. Nos. 09/535,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

Power Supply Circuit and Pulser Module

The solid-state pulser module 22 and high voltage power supply (not separately shown) supply electrical energy in compressed electrical pulses to the preionization and main electrodes 23 within the laser chamber 1 to energize the gas mixture. Components of the preferred pulser module and high voltage power supply may be described at U.S. patent application Nos. 60/149,392, 60/198,058, 60/204,095, Ser. Nos. 09/432,348 and 09/390,146, and No. 60/204,095, and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 3 Joules of electrical power (see the '988 patent, mentioned above).

Laser Resonator

The laser resonator which surrounds the laser chamber 1 containing the laser gas mixture includes optics module 5 including line-narrowing optics for a line narrowed excimer or molecular fluorine laser, which may be replaced by a high reflectivity mirror or the like in a laser system wherein either line-narrowing is not desired, or if line narrowing is performed at the front optics module 10, or a spectral filter external to the resonator is used, or if the line-narrowing optics are disposed in front of the HR mirror, for narrowing the linewidth of the output beam. The laser chamber 1 is sealed by windows transparent to the wavelengths of the emitted laser radiation. The windows may be Brewster windows or may be aligned at another angle, e.g., 5°, to the optical path of the resonating beam. One of the windows may also serve to output couple the beam.

Extra-Resonator Features

After a portion of the output beam 12 passes the beam splitter 9a or outcoupler in other configurations, that output portion impinges upon beam splitter module 9b which includes optics for deflecting a portion of the beam to the diagnostic module 7, or otherwise allowing a small portion of the outcoupled beam to reach the diagnostic module 7, while a main beam portion 12 is allowed to continue as the output beam 12 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 7. A holographic beam sampler, transmission grating, partially transmissive reflection diffraction grating, grism, prism or other refractive, dispersive and/or transmissive optic or optics may also be used to separate a small beam portion from the main beam 12 for detection at the diagnostic module 7, while allowing most of the main beam 12 to reach an application process directly or via an imaging system or otherwise.

The output beam 12 may be transmitted at the beam splitter module 9a while a reflected beam portion is directed at the optics module 5 and an additional beam splitter 9b reflects a beam portion of the beam to the diagnostic module 7, or the main beam 12 may be reflected, while a small portion is transmitted to the diagnostic module 7. The portion of the outcoupled beam which continues past the beam splitter modules 9a and 9b is the output beam 12 of the laser, which propagates toward an industrial or experimental application such as an imaging system and workpiece for photolithographic applications. Variations of beam splitter modules particularly for a molecular fluorine laser system are set forth at U.S. patent application Ser. No. 09/598,552 and No. 60/140,530, which are each assigned to the same assignee and are hereby incorporated by reference.

Beam Path Enclosure

Also particularly for the molecular fluorine laser system, and for the ArF laser system, an enclosure (not shown) may seal the beam path of the beam 12 such as to keep the beam path free of photoabsorbing species. Smaller enclosures may seal the beam path between the chamber 1 and the optics modules 5 and 10 and between the beam splitters 9a and 9b and between the beam splitter 9b and the diagnostic module 7, and after the beam splitter 9b to an imaging system or application process (not shown). The preferred enclosure is described in detail in the Ser. Nos. 09/343,333, 09/598,552, 09/594,892, 09/131,580 and No. 60/140,530 applications, each of which is assigned to the same assignee and is hereby incorporated by reference, and U.S. Pat. Nos. 5,559,584, 5,221,823, 5,763,855, 5,811,753 and 4,616,908, all of which are hereby incorporated by reference.

Diagnostic Module

The diagnostic module 7 preferably includes at least one energy detector (not specifically shown). This detector measures the total energy of the beam portion that corresponds directly to the energy of the output beam 12 (see U.S. Pat. No. 4,611,270 and U.S. patent application Ser. No. 09/379, 034, each of which is assigned to the same assignee and is hereby incorporated by reference). An optical configuration such as an optical attenuator, e.g., a plate or a coating, or other optics may be formed on or near the detector or beam splitter module 9b to control the intensity, spectral distribution and/or other parameters of the radiation impinging upon the detector (see U.S. patent application Ser. No. 09/172, 805, Nos. 60/172,749, 60/166,952 and 60/178,620, each of which is assigned to the same assignee as the present application and is hereby incorporated by reference).

One other component of the diagnostic module 7 is preferably a wavelength and/or bandwidth detection component, or wavemeter, such as including a monitor etalon or grating spectrometer (see generally U.S. patent application Ser. No. 09/416,344, Nos. 60/186,003, 60/158, 808, 60/186,096, 60/186,096 and 60/186,096 and 60/202, 564, each of which is assigned to the same assignee as the present application, and U.S. Pat. Nos. 4,905,243, 5,978, 391, 5,450,207, 5,420,877, 4,926,428, 5,748,346, 5,025,445, and 5,978,394, all of the above wavelength and/or bandwidth detection and monitoring components being hereby incorporated by reference). Further details of the preferred wavemeter of the diagnostic module 7 are set forth below.

Other components of the diagnostic module may include a pulse shape detector or ASE detector, such as are described at U.S. patent application Ser. Nos. 09/484,818 and 09/418, 052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206, which is assigned to the same assignee and is hereby incorporated by reference.

Control Processor

The processor or control computer 4 receives and processes values of some of the pulse shape, energy, ASE, energy stability, energy overshoot for burst mode operation, wavelength, spectral purity and/or bandwidth, among other input or output parameters of the laser system and output beam. The processor 4 also controls the line narrowing module to tune the wavelength and/or bandwidth or spectral purity, and controls the power supply and pulser module 22 to control preferably the moving average pulse power or energy, such that the energy dose at points on the workpiece is stabilized around a desired value. In addition, the computer 4 controls the gas handling module 24 which includes gas supply valves connected to various gas sources. Further functions of the processor 4, particularly in conjunction with the preferred wavemeter of the diagnostic module 7, are described in more detail below.

Gas Mixture

The laser gas mixture is initially filled into the laser chamber 1 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405 and 4,977,573 and U.S. patent application Ser. Nos. 09/317,526, 09/513,025, No. 60/124,785, Ser. No. 09/418,052, Nos. 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, may be added for increased energy stability and/or as an attenuator as described in the Ser. No. 09/513,025 application incorporated by reference above. Specifically, for the F2-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Gas Replenishment

Halogen and rare gas injections, total pressure adjustments and gas replacement procedures are performed using the gas handling module 24 preferably including a vacuum pump, a valve network and one or more gas compartments. The gas handling module 24 receives gas via gas lines connected to gas containers, tanks, canisters and/or bottles. Some prefered and alternative gas handling and/or replenishment procedures, other than as specifically described herein (see below), are described at U.S. Pat. Nos. 4,977,573 and 5,396,514 and U.S. patent application No. 60/124,785, Ser. Nos. 09/418,052, 09/379,034, Nos. 60/171,717, and 60/159,525, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Line-Narrowing

A general description of the line-narrowing features of the several embodiments of the present is provided here, followed by a listing of patent and patent applications being incorporated by reference as describing variations and features that may used within the scope of the present invention for providing an output beam with a high spectral purity or bandwidth (e.g., below 1 pm). Exemplary line-narrowing optics contained in the optics module 5 include a beam expander, an optional etalon and a diffraction grating, which produces a relatively high degree of dispersion, for a narrow band laser such as is used with a refractive or catadioptric optical lithography imaging system. As mentioned above, the front optics module may include line-narrowing optics as well (see the Nos. 60/166,277, 60/173,993 and 60/166,967 applications, each being assigned to the same assignee and hereby incorporated by reference).

For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 5 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the No. 60/178,445 and Ser. No. 09/317,527 applications, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, Nos. 60/124,241, 60/140,532, 60/147,219 and 60/140,531, 60/147,219, 60/170,342, 60/172,749, 60/178,620, 60/173,993, 60/166,277, 60/166,967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Beam splitter module 9a is shown for outcoupling the beam 12, and as such is a partially reflective mirror. The beam 12 may be otherwise outcoupled such as by a partially reflecting mirror at the optics module 10, wherein the wavelength calibration tool 2 is moved from the output beam path, or by an intra-resonator beam splitter or partially reflecting surface of another optical element, and the beam splitter module 9a would in this case include a highly reflective mirror. An optics control module may control the optics modules 5 and 10 such as by receiving and interpreting signals from the processor 4, and initiating realignment or reconfiguration procedures (see the '241, '695, '277, '554, and '527 applications mentioned above).

Wavelength Tuning and Control

Techniques are available for tuning and controlling central wavelengths of emission or an excimer or molecular fluorine laser. Absolute wavelength calibration techniques use a known absorption or emission line around the wavelength of interest as a reference (see U.S. Pat. Nos. 4,905, 243, 4,926,428, 5,450,207, 5,373,515, 5,978,391, 5,978,394 and 4,823,354, and F. Babin et al., Opt. Lett., v. 12, p. 486 (1987), and R. B. Green et al., Appl. Phys. Lett., v. 29, p. 727 (1976), as well as U.S. patent application Ser. No. 09/416, 344, No. 60/186,003 and Ser. No. 09/271,020, each application being assigned to the same assignee as the present application, all of the above being hereby incorporated by reference).

Figure 1B:
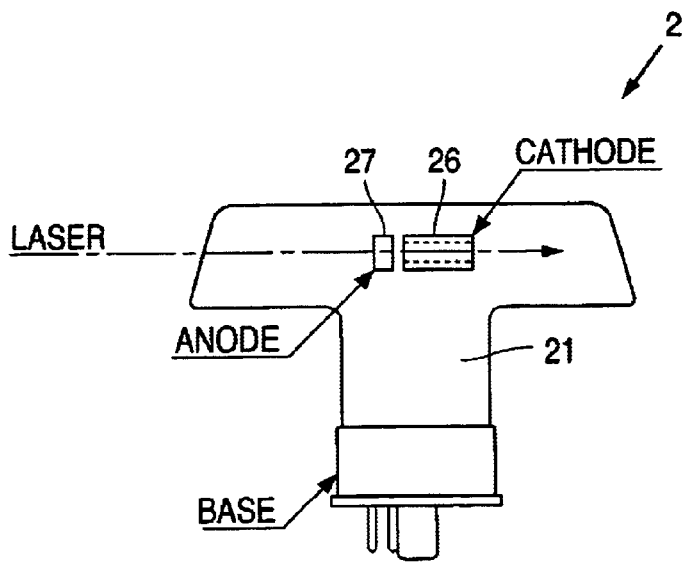
FIG. 1b schematically shows a galvatron for absolute wavelength calibration.

The opto-galvanic effect may be used to determine the laser absolute emission wavelength (see Babin, above). For this purpose, a galvatron 21 of the wavelength calibration tool 2 may be set in the optical path of the laser beam, as shown in FIG. 1a. Referring now to FIG. 1b, the galvatron 21 has an anode 27 and a cathode 26 and is filled with a gaseous vapor such as Fe, Pt, or Ge vapor. A voltage is monitored between the cathode and anode. The emission bandwidth of the laser is narrowed and the central wavelength tuned through a range around 248 nm. When the wavelength of the beam impinging the gaseous vapor filled gas volume between the cathode 26 and the anode 27 corresponds to an atomic transition of the gaseous vapor, a resonance between the energy levels of the gaseous vapor causes a marked change in voltage between the anode 27 and cathode 26. Since the absorption lines of the gaseous vapor filling the galvatron 21 are well known and consistent, e.g., based on standards set forth by NIST, the absolute wavelength of the narrowed laser emission band is determinable.

Figure 1C:
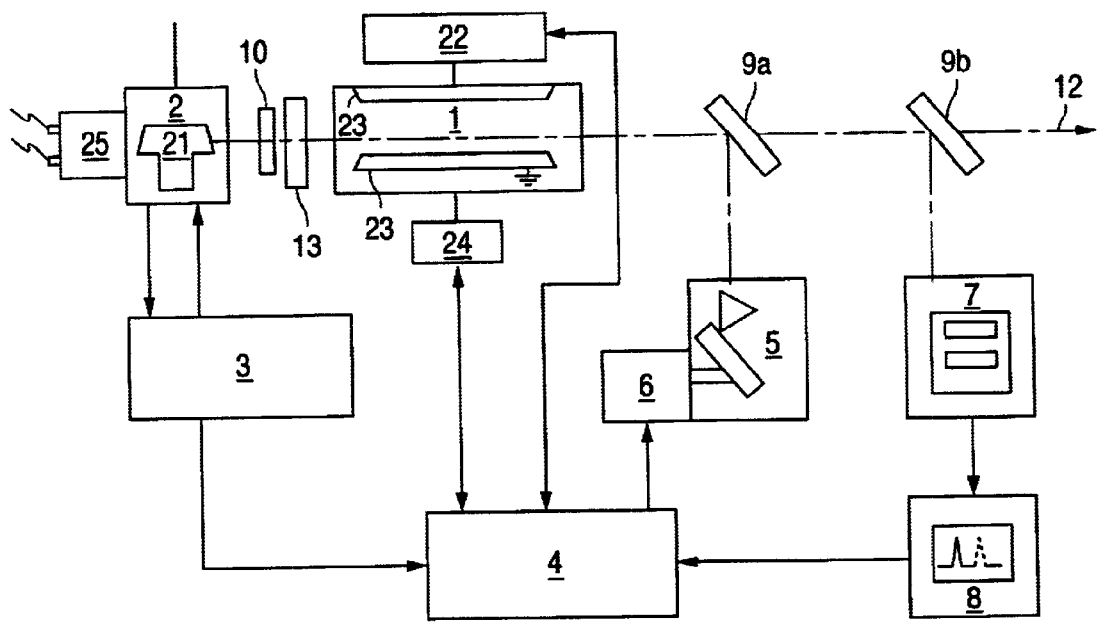
FIG. 1c schematically shows a second embodiment of a laser system in accord with a preferred embodiment.

Referring to FIG. 1c, a photodetector 25 may alternatively be used to detect the intensity of light emitted from a laser (see U.S. Pat. No. 4,823,354 to Znotins et al., and U.S. Pat. No. 5,450,207). The cathode may give off gaseous vapor which fills the galvatron when a current is generated between the cathode 26 and an associated anode 27. Light emitted from the laser traverses the gaseous vapor medium of the galvatron 21 before impinging the photodetector 25. When the wavelength corresponds to an atomic transition of the gas medium of the galvatron, the gas absorbs the light, and the intensity of light detected is reduced. Thus, the absolute wavelength of emission of the laser is also determinable in this alternative way. Another known technique uses sealed hollow cathode lamps containing gaseous vapor in a buffer gas environment (see Hammamatsu Datasheet: Opto-Galvanic Sensor, Galvatron L 2783 Series, Nov. 89, Japan, which is hereby incorporated by reference).

A monitor Fabry-Perot etalon spectrometer of the diagnostic module 7 may be used to determine relative wavelength shifts away from the known absorption lines of the gas in the galvatron 21, e.g., at 248.3271 nm and 248.4185 nm, for an Fe lamp for use with the KrF laser, among others (see U.S. Pat. No. 4,905,243, which is hereby incorporated by reference). To do this, the laser wavelength is first calibrated to the absolute wavelength reference line, e.g., 248.3271 nm, and the laser beam is directed through the etalon. An interferometric image is projected onto a solid state image detector such as a CCD array. Next, the laser wavelength is tuned away from the 248.3271 nm line to a new wavelength. A new image is projected onto the detector, and a comparison with the original image reveals the new wavelength because the free spectral range (FSR) of the monitor etalon is presumably known (e.g., 9.25 pm) and constant. For example, if it is desired to tune the laser to 248.3641 nm, then the wavelength would be adjusted 37 pm above the 248.3271 nm Fe vapor absorption line to exactly coincide with four FSRs of the monitor etalon.

A mercury lamp for emitting reference light of known wavelength may also be used (see U.S. Pat. No. 5,748,316, which is hereby incorporated by reference). The reference light and the laser beam are each directed to the monitor etalon. A comparison of the fringe patterns produced by the reference light and the laser beam allows a determination of the wavelength of the laser beam relative to that of the reference light.

Other optical characteristics of a laser beam that are desired to know and control are the bandwidth and spectral purity. The bandwidth can be measured as the full width at half maximum (FWHM) of a spectral intensity distribution of a measured laser pulse. The spectral purity is determined as the spectral range within which lies 95% of the energy of the laser pulse. The spectrometer of a wavemeter such as an etalon or grating spectrometer may be used for this purpose as well as for monitoring the wavelength of the beam.

The bandwidth of a laser beam can be determined from measuring the widths of fringes produced as the laser beam is passed through a monitor etalon and projected onto a CCD array. A grating spectrometer may also be used and the bandwidth measured in a similar fashion (see U.S. Pat. Nos. 5,081,635 and 4,975,919, each of which is hereby incorporated by reference).

FIG. 2 illustrates an etalon spectrometer 2 for use with a wavelength monitoring technique of a laser. The spectrometer 2 is preferably an etalon spectrometer 2, as shown, or alternatively may include a grating. The preferred etalon produces an interference pattern that may be used to determine, set and monitor the wavelength of the incident light in a feedback arrangement including the processor 4, when calibrated to an absolute reference such as an absorption line of a gaseous vapor filling a galvatron 21 as described above.

The spectrometer 2, whether including an etalon or a grating, measures an interference or diffraction pattern, respectively, when the wavelength of the beam corresponds to a known absorption or emission line of an absolute wavelength reference, as discussed above. In each case, an intensity distribution appears on a detector such as a CCD array. The wavelength of the beam is then tuned to a desired wavelength, which is known based on how the interference or diffraction pattern changes as the wavelength is tuned. For example, the wavelength has been tuned by one free spectral range of the etalon when an adjacent ring appears at a same pixel position on the detector as a previous ring. Since the free spectral range (FSR) of the etalon is known (see, e.g., U.S. patent application No. 60/186,003, incorporated by reference above), then the shift of the laser wavelength from the absolute reference wavelength is known. A similar method may be performed with a grating spectrometer, wherein lines from the grating will move with respect to the detector pixels such that the wavelength shift is again monitorable.

It may be known in advance at what position the etalon fringe or grating line will appear on the array at the target wavelength. In the case of the etalon, e.g., the number of complete FSRs are first tuned past an initial pixel location at which the laser is tuned to the absolute reference, and then the fraction of an FSR left over will determine where the fringe is to be positioned on the detector. A computer having this target wavelength programmed or input into it can automatically determine how far away from the target wavelength that a present wavelength is, and then can signal an element within the line narrowing unit of the resonator to be moved to a particular position to tune the wavelength to the target value.

The processor can periodically check the actual laser wavelength against the target wavelength by analyzing the intensity distribution at the detector. The processor can then calculate the wavelength that corresponds with an etalon ring or grating line maxima being at a particular pixel location on the detector. The processor is preprogrammed to know what pixel location that the etalon ring or grating line would be at if the laser beam was at the target wavelength using the absolute reference, and knows how many picometers in laser wavelength corresponds to each pixel. So, the processor can calculate how much the wavelength tuning element, such as a stepper on a grating or mirror within the resonator such as in a Littrow or Littman configuration, or as in a tiltable etalon, should be moved to adjust the laser wavelength to the target wavelength.

Once the laser wavelength is adjusted initially to the target wavelength, then laser wavelength fluctuations would not vary by more than a FSR of an etalon spectrometer. Thus, the interference fringe pattern on the detector may be monitored by the processor to determine the wavelength of the laser. When the center of the fringe has moved to a different pixel location, the processor can calculate the wavelength difference from the target wavelength by knowing how many picometers corresponds to a movement of the fringe by each pixel. Since the processor also knows how many picometers corresponds to each tuning step for the rotatable grating, etalon or mirror of the resonator, then the processor can signal that the tunable element be moved to change the wavelength precisely to the target wavelength by adjusting the wavelength by the wavelength difference determined from the fringe position on the detector.

Figure 2A:
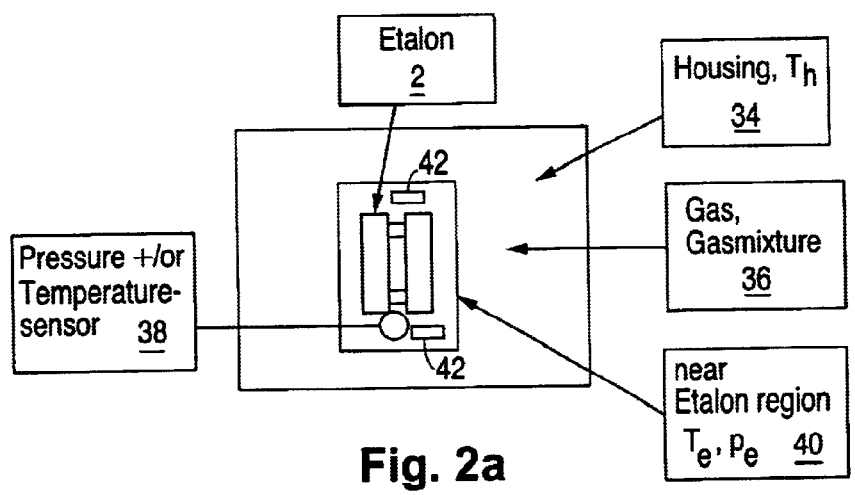
FIGS. 2a and 2b illustrates an etalon spectrometer 2 for use with a wavelength monitoring technique of a laser.

The etalon spectrometer 2 of FIG. 2a is disposed within a housing 34. The housing 34 of FIG. 2a is filled with a gas mixture 36. A pressure sensor and/or a temperature sensor 38 is shown for measuring a quantity that is respectively indicative of a pressure and/or a temperature proximate to the spectrometer 2 within the housing 34, such as in the region 40 around the spectrometer 2. In a preferred embodiment, both a temperature sensor and a pressure sensor are included. The temperature and pressure sensors are preferably conventional as understood by those skilled in the art. Heater elements 42 may be included for adjusting the temperature in the region 40. The heater elements may be disposed otherwise in the housing or outside the housing, such as to heat the housing walls. A component for cooling the region 40 may also be used, such as a cooling water supply, fan or compressor using a refrigerant around the housing. A conventional commercial temperature controller such as may be purchased from an electronics manufacturer such as Siemens, SIS, Linear Research, IMO Precision Controls, Toshiba, McShane, ILX Lightwave, Photonics Spectra, Fine Science, Advantage Engineering, Laser Max, Thor Labs, Reps, Gamry Instruments, Eurotherm Controls, or any of a number of other suppliers of temperature controllers for controlling temperatures around standard temperatures, may be used for controlling the temperature.

The etalon 2 is disposed within a housing 34 having a controlled atmosphere. The housing 34 may be insulated for providing thermal stability in addition to that provided by selecting the pressure and temperature and materials of the housing and spectrometer as discussed below.

Figure 2B:
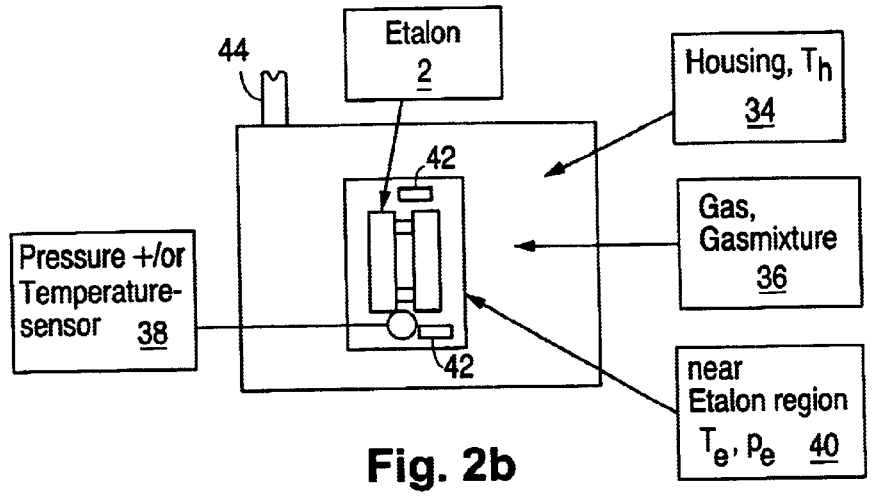

The number of molecules of gas within the housing may be fixed if the housing 34 is sealed as in the embodiment of FIG. 2a. At the time of sealing of the housing, the pressure that will be approximately maintained in the sealed housing is measured and may be set. Alternatively, a port 44 may be included as shown in FIG. 2b. An inert gas, such as nitrogen, argon, helium, or another gas that does not absorb significantly around the wavelengths to be monitored nor react significantly with materials of the housing or spectrometer, may be flowed into and/or out of the housing 34 for adjusting or controlling the pressure. The gas may be flowed into or out of the housing 34 through the port. The housing may also be pumped, e.g., using a conventional roughing pump or turbo pump, to a low pressure through the port 44. More than one port may be included such as an inlet and outlet port pair for flowing an inert gas continuously through the housing. A separate pump port may be included, and the housing may be pumped and then purged with the inert gas to a desired pressure. A valve may be used to seal the housing once the pressure is at a desired pressure, such that the valve may be opened to reset the pressure at another time.

The above-described embodiments of the wavemeter design, wherein the pressure and temperature are controlled at particular values with respect to the housing and spectrometer materials, may be used to minimize or eliminate the thermal sensitivity of the wavemeter. The pressure and temperature in the housing, as well as the materials of the etalon or grating and the inert gas filling the housing, are thus preferably each selected to minimize $d\lambda/dT_e$, such that even if the temperature fluctuates in a typical way, the wavelength stability will be improved. The temperature may also be controlled to fluctuate less than it does in conventional wavemeters, such that the wavelength stability is further improved according to the preferred embodiments.

The degree to which the monitored wavelength will change with temperature is minimized by selecting the pressure within the housing and the temperature, or selecting one based on the other, and properties of the materials within the housing. Means have been described for controlling the temperature and/or the pressure within the housing, and materials of known thermal expansion properties may be selected. The curve $d\lambda/dT_e$, or $d\lambda/dT_g$, versus pressure in the housing could be measured and/or calculated for an etalon or grating spectrometer comprising materials already preselected, or at least their thermal properties are known, and the pressure is set to that pressure measured or calculated to be at a minimum in $d\lambda/dT_e$ or $d\lambda/dT_g$, at a selected or typical operating temperature.

The preferred embodiments of wavemeters for detecting the wavelength of laser emission are designed to have a very high accuracy. The preferred embodiments are particularly designed to reduce or minimize wavelength shifts of the wavemeter due to temperature variations. It is shown below how the pressure, temperature and materials of the housing and spectrometer are selected to achieve the objects of the invention using the wavemeter shown in FIG. 2a or 2b, or variation described thereof.

The known etalon relation is now given:

$$\lambda = (2/m) n \, s \, \cos\theta \tag{2}$$

where m is an integer, s is the thickness of spacers of the etalon which determine the etalon gap spacing, n is the refractive index in the etalon gap, and $\theta$ is the angle of incidence of light impinging upon the etalon.

The wavelength variation due to variations of the etalon temperature $T_e$ and housing temperature $T_h$ is given by differentiating equation (2), above, as:

$$d\lambda = \lambda(ds/dT_e * dT_e/s + dn/dT_e * dT_e/n + dn/dT_h * dT_h/n) \tag{3}$$

where the refractive index is given by:

$$n = 1 + (n_0-1)\rho_e/\rho_0 = 1 + (n_0-1)T_0/p_0 * p_e/T_e \tag{4}$$

where $p_e$, $T_e$, $\rho_e$ are the operational pressure, temperature and gas density in the etalon gap, and $p_0$, $T_0$, $\rho_0$, $n_0$ are values for standard conditions (e.g., 1 bar, 0° C.).

The third term in equation (3) is related to the thermal volume expansion of the housing and is equal to $(n_0-1)dV/dT_h * dT_h/V$, where V is the volume of the housing. As a result, we get:

$$d\lambda = (\alpha_s dT_e - (n_0-1)T_0/p_0 * (p_e/T_e^2) * dT_e - 3\alpha_h(n_0-1)dT_h) \tag{5}$$

where $\alpha_s$ is the linear expansion coefficient of the spacer material and $\alpha_h$ is the linear expansion coefficient of the housing material.

The temperature sensitivity of the etalon spectrometer only can be minimized by setting $d\lambda/dT_e=0$. This is fulfilled for:

$$p_e/p_0 - (\alpha_e T_e^2)/((n_0-1)T_0) = 0 \tag{6}$$

Figure 3:
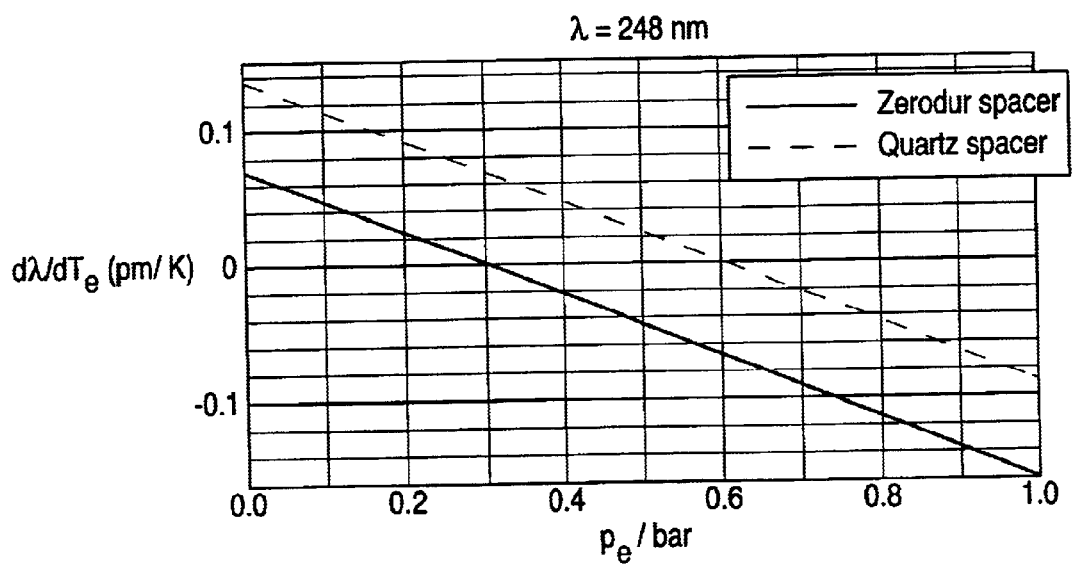
FIG. 3 shows the dependences of $d\lambda/dT_e$ the operational pressure $p_e$ for the spacer materials quartz and zerodure for a $N_2$—filled (30° C.) etalon spectrometer housing.

FIG. 3 shows calculated dependencies of $d\lambda/dT_e$ on the operational pressure $p_e$ for the spacer materials quartz and zerodure for a $N_2$—filled (30° C.) etalon spectrometer housing. The calculated curves in FIG. 3 are based on the following parameters:

$\alpha_e = 5.5\times10^{-7}$/K (Quartz), $2.8\times10^{-7}$/K (Zerodur)

$\alpha_h = 18\times10^{-6}$/K (stainless steel)

$(n_0-1) = 0.000300$ ($N_2$, at 0° C., 1 bar)

$3\alpha_h(n_0-1) = 0.16\times10^{-7}$/K $T_e = 30°$ C. $= 303°$ K, $T_0 = 0°$C. $= 273°$ K, $P_0 = 1$ bar "Temperature compensation" or a minimim in the thermal sensitivity of the wavelength measured by the spectrometer is achieved at $p_e=0.61$ bar (quartz spacer) and $p_e=0.3$ bar (zerodure spacer) (see FIG. 3). Temperature compensation in this sense means the temperature dependence of $\lambda$ is determined by the thermal housing expansion only, since the thermal sensitivity of the etalon itself is reduced to zero at these values. This gives a reduction of the temperature sensitivity by nearly a factor of $\alpha_s/3\alpha_h \approx 30$. An improvement in the temperature sensitivity of a wavemeter even by a factor of 5 or 10 would be a significant advantage, and in accord with the preferred embodiment, such an improvement is readily achieved.

If the pressure is maintained at less than 0.75 bar in the gap of an etalon having zerodur spacers, then the thermal stability of the measured wavelength can be maintained within ±0.1 pm/°K. If the pressure is maintained at between 0.2 bar and 1.0 bar for an etalon having quartz spacers, then a similar thermal stability of the measured wavelength may be realized. The closer the pressure is maintained to the value of 0.3 bar for the etalon with zerodur spacers and to the value of 0.6 bar for the etalon having quartz spacers, the greater the wavelength stability will be for a same degree of thermal fluctuation in the vicinity of or proximate to the wavemeter. Other materials may be used, wherein different pressure values would apply. For example, if the pressure is maintained between 0.2 bar and about 0.4 bar for an etalon spectrometer having zerodur spacers, then the thermal stability of the measured wavelength would be within ±0.02 pm/°K, and if the pressure is maintained between 0.5 bar and 0.7 bar for an etalon spectrometer having quartz spacers, then the thermal stability of the measured wavelength would be within ±0.02 pm/°K as well, and so on, as can be observed by inspecting the graphs of FIG. 3.

Temperature compensation for an operational pressure $p_e=1$ bar can be achieved, e.g., under the following conditions:

the etalon housing is filled with dry air ($T_e=20°$ c.$=293$ K);

$(n_0-1)=0.0003014$ (250 nm, $T_0=288$ K, $p_0=1$ bar);

$\alpha_e=1 \; 10^{-6}$/K (materials: Invar (0.3 . . . $1.5*10^{-6}$/K), Cordierite ($1.1*10^{-6}$/K).

If the heat contact between the etalon and the housing is very good, the temperature $T_e$ follows $T_h$ instantaneously and $dT_e$ is proportional to $dT_h$. In this case the two effects, i.e., spacer expansion and gas density changes due to expansion of the housing, sum to give a single effective thermal expansion coefficient and this can completely compensate the second term of equation (5), which includes the sensitivities of both the etalon spectrometer and the housing (where $\alpha_e$ in equation (6) is replaced by an effective expansion coefficient).

If a grating spectrometer is used for the wavelength measurement and laser control, the temperature compensation procedure is similar to that described above. The grating equation, $m\lambda(T)=2n(T)d(T)\sin\theta$ shows a same proportional dependence of the wavelength $\lambda(n(P(T)))$ on the temperature and pressure dependent index of refraction $n(P(T))$ and ruling spacing as the etalon to the refractive index and gap spacing as illustrated by equation (2). For a grating used at constant angles of incidence and diffraction, the effects of temperature and pressure on the gas refractive index, and hence on the wavelength measured, are the same as the effects for an etalon spectrometer. Thus, if the etalon spacer and the grating substrate materials are the same, such that distance d between rulings of the grating and the gap spacing d of the etalon change at the same rate with temperature, the wavelength shifts due to temperature variations are the same for the etalon and the grating spectrometers. Thus, the present invention may be used with an etalon or a grating spectrometer.

Once the materials are selected, and the target pressure and the target temperature set at values such that the thermal dependence of the measured wavelength is minimized according to the preferred embodiment, there are other ways to further improve the wavelength stability of the wavemeter. One thing that can be done is to calculate an adjustment to the wavelength measured by the wavemeter as in the '877 patent, mentioned above. The wavelength stability of this adjusted wavelength should have an improved stability which is some multiple less than the measured wavelength. By combining the 5 to 10, or 30 or higher factor improvement of the wavelength stability with the improved stability obtained by adjusting the measured values according to the '877 patent, a still improved wavelength stability may be achieved.

Another thing that can be done to improve the wavelength stability is to control the temperature and/or pressure fluctuation of the spectrometer. This may be achieved by using a temperature controller as suggested above. A thermocouple or other conventional sensor along with a heater and/or cooling mechanism around the wavemeter may be used. Thus, not only are the materials, temperature and pressure preferably selected to minimize the temperature dependence of the measured wavelength, but also the temperature does not fluctuate as much as it does with conventional wavemeters. A further improved wavelength stability is thus achieved.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A wavemeter for monitoring a wavelength of emission from a tunable laser, comprising:
   a housing having at least one port for flowing an inert gas into or out of the housing;
   a spectrometer disposed within the housing;
   a pressure sensor for monitoring pressure within the housing; and
   means responsive to the pressure sensor for controlling the pressure within the housing by causing inert gas to flow into or out of the housing through said port for providing a temperature sensitivity of the spectrometer within ±0.1 pm/°K.

2. A wavemeter as in claim 1, further comprising a temperature sensor for at least estimating the temperature proximate to the spectrometer within the housing.

3. A wavemeter as in claim 2, wherein said temperature sensor is disposed proximate to the spectrometer within the housing.

4. A wavemeter as in claim 1, further comprising means for controlling the temperature within the housing.

5. A wavemeter as in claim 1, wherein said spectrometer includes an etalon, and wherein said pressure and said temperature are approximately related by the following equation:

$$p_e/p_o-((\alpha_e T_e^2)/((n_0-1)T_0))\approx 0;$$

where $p_e$ and $T_e$ are the operational pressure and the operational temperature, respectively, proximate to the spectrometer within the housing;
   $\alpha_e$ is a coefficient of thermal expansion of one or more spacers of said etalon;
   $p_0$ is atmospheric pressure;
   $T_0$ is approximately 0° C.; and
   $n_0$ is a refractive index of the gas at $p_0$ and $T_0$.

6. A wavemeter as in claim 1, wherein said spectrometer includes an etalon having spacers made of a material having a relatively low thermal expansion coefficient.

7. A wavemeter as in claim 6, wherein said spacer material is selected from the group of materials consisting of quartz, zerodur, invar and Cordierite.

8. A method for monitoring a wavelength of emission from a tunable laser, using a wavemeter including a spectrometer, comprising:
   disposing said spectrometer within a housing having a controlled pressure;
   sensing a pressure at least indicative of a pressure within said housing proximate to said spectrometer; and
   controlling the pressure within said housing approximately around a predetermined value which is selected based at least in part on a temperature within said housing, for providing a temperature sensitivity of the spectrometer within ±0.1 pm/°K.

9. A method as in claim 8, further comprising the step of sensing a temperature at least indicative of a temperature within the housing proximate to the spectrometer.

10. A method as in claim 8, wherein said pressure controlling step includes flowing an inert gas through a port of said housing.

11. A method as in claim 8, wherein said pressure controlling step includes pumping said housing through a port of said housing.

12. A method for monitoring a wavelength of emission from a tunable laser, using a wavemeter including a spectrometer, comprising:
   disposing said spectrometer within a housing having a controlled pressure; and pre-setting and substantially maintaining a temperature and a pressure within said housing at substantially predetermined values, for providing a temperature sensitivity of the spectrometer within ±0.1 pm/°K.

13. A method as in claim 12, further comprising the step of sensing a pressure at least indicative of a pressure within the housing proximate to the spectrometer.

14. A method as in claim 12, further comprising the step of flowing an inert gas through a port of said housing for controlling said pressure within said housing around a predetermined value.

15. A method as in claim 12 further comprising the step of pumping said housing through a port of said housing for controlling said pressure within said housing around a predetermined value.

16. A method as in claim 12, wherein said spectrometer includes an etalon, and said method further comprises the step of preparing said wavemeter such that the temperature and the pressure are related by the following equation:

$$p_e/p_o - (\alpha_e T_e^2)/((n_0-1)T_0) \approx 0;$$

where $p_e$ and $T_e$ are the operational pressure and the operational temperature, respectively, proximate to the spectrometer within the housing;

$\alpha_e$ is a coefficient of thermal expansion of one or more spacers of said etalon;

$p_0$ is atmospheric pressure;

$T_0$ is approximately 0° C.; and $n_0$ is a refractive index of the gas at $p_0$ and $T_0$.

17. A method as in any of claim 8 or 12 wherein said spectrometer includes an etalon, and the method further comprises the step of forming spacers of said etalon of a material having a relatively low thermal expansion coefficient.

18. A method as in claim 17, wherein said spacer material is selected from the group of materials consisting of quartz, zerodur, invar and Cordierite.

19. A wavemeter for monitoring a wavelength of emission from a tunable laser, comprising:

means for measuring the wavelength of said laser emission;

means for sensing a pressure at least indicative of a pressure around said measuring means, and means for controlling the pressure approximately around a predetermined value selected based at least in part on a temperature around said measuring means, for providing a temperature sensitivity of the measuring means within ±0.1 pm/°K.

20. A wavemeter as in claim 19, wherein said means for measuring the wavelength of said laser emission includes an etalon, and wherein said pressure and said temperature are approximately related by the following equation:

$$p_e/p_o - (\alpha_e T_e^2)/((n_0-1)T_0) \approx 0;$$

where $p_e$ and $T_e$ are the operational pressure and the operational temperature, respectively, proximate to the etalon within the housing;

$\alpha_e$ is a coefficient of thermal expansion of one or more spacers of said etalon;

$p_0$ is a pressure value for standard conditions;

$T_0$ is a temperature value for standard conditions; and $n_0$ is a refractive index of the gas for standard conditions.

21. A method as in claim 8, wherein said spectrometer includes an etalon, and said method further comprises the step of preparing said wavemeter such that the temperature and the pressure are related by the following equation:

$$p_e/p_o - (\alpha_e T_e^2)/((n_0-1)T_0) \approx 0;$$

where $p_e$ and $T_e$ are the operational pressure and the operational temperature, respectively, proximate to the spectrometer within the housing;

$\alpha_e$ is a coefficient of thermal expansion of one or more spacers of said etalon;

$p_0$ is a pressure value at standard conditions;

$T_0$ is a temperature value at standard conditions; and $n_0$ is a refractive index of the gas for standard conditions.

* * * * *